(12) United States Patent
Foster et al.

(10) Patent No.: US 7,616,219 B2
(45) Date of Patent: Nov. 10, 2009

(54) DRAWING STYLE DOMAINS

(75) Inventors: Mason J. Foster, Walnut Creek, CA (US); Jose Madeira De Freitas Garcia, San Francisco, CA (US); Joseph Cleveland Ard, Matthews, NC (US)

(73) Assignee: Autodesk, Inc., San Rafael, CA (US)

( * ) Notice: Subject to any disclaimer, the term of this patent is extended or adjusted under 35 U.S.C. 154(b) by 345 days.

(21) Appl. No.: 11/268,796

(22) Filed: Nov. 8, 2005

(65) Prior Publication Data
US 2007/0106929 A1   May 10, 2007

(51) Int. Cl.
G09G 5/00        (2006.01)

(52) U.S. Cl. .................. 345/622; 345/620; 345/624; 345/626

(58) Field of Classification Search ......... 345/620–628; 715/802
See application file for complete search history.

(56) References Cited

U.S. PATENT DOCUMENTS

| | | | |
|---|---|---|---|
| 4,941,193 A | | 7/1990 | Barnsley et al. |
| 4,970,666 A | | 11/1990 | Welsh et al. |
| 5,861,886 A | * | 1/1999 | Moran et al. ............... 715/863 |
| 6,007,338 A | | 12/1999 | DiNunzio et al. |
| 6,031,541 A | | 2/2000 | Lipscomb et al. |
| 6,128,019 A | | 10/2000 | Crocker et al. |
| 6,373,499 B1 | * | 4/2002 | Acker .................... 345/619 |
| 6,813,042 B2 | * | 11/2004 | Hawksworth et al. ........ 358/1.9 |
| 6,912,293 B1 | | 6/2005 | Korobkin |
| 7,038,694 B1 | | 5/2006 | Santodomingo et al. |
| 7,050,067 B2 | * | 5/2006 | Raubacher et al. .......... 345/611 |
| 7,190,376 B1 | * | 3/2007 | Tonisson .................. 345/629 |
| 2003/0011599 A1 | | 1/2003 | Du |
| 2004/0263512 A1 | | 12/2004 | Santodomingo et al. |
| 2005/0108215 A1 | | 5/2005 | Thomas et al. |
| 2005/0122334 A1 | | 6/2005 | Boyd et al. |
| 2005/0225552 A1 | | 10/2005 | Anand |

OTHER PUBLICATIONS

Title: The Prologue Battle, Date: Jun. 10, 2004, URL: http://web.archive.org/web/*/http://lsdis.cs.uga.edu/~cthomas/courses/anim/slides/lotr_prologue_battle.html.

* cited by examiner

Primary Examiner—Hau H Nguyen
(74) Attorney, Agent, or Firm—Gates & Cooper LLP

(57) ABSTRACT

A method, apparatus, and article of manufacture provide the ability to modify an appearance style of a computer generated rendering. A computer generated rendering consisting of vector geometry is obtained. A closed second geometry is created in the computer generated rendering. The closed second geometry is then converted to a domain. An appearance style for an active region of the domain is identified and applied to all vector geometry in the active region on a per-pixel basis.

34 Claims, 5 Drawing Sheets

DRAWING STYLE DOMAINS

CROSS-REFERENCE TO RELATED APPLICATIONS

This application is related to the following co-pending and commonly-assigned patent application, which application is incorporated by reference herein:

U.S. patent application Ser. No. 11/268,797, entitled "AUTOMATIC ELEMENT SUBSTITUTION IN VECTOR-BASED ILLUSTRATIONS", by Mason J. Foster, filed on the same date herewith.

BACKGROUND OF THE INVENTION

1. Field of the Invention

The present invention relates generally to architectural renderings, and in particular, to a method, apparatus, and article of manufacture for applying a rendering style to a designated area of an architectural rendering.

2. Description of the Related Art

In the architectural, engineering, and construction (AEC) fields, computer aided design (CAD) drawings are often used to design blueprints, drawings, plans, etc. However, such CAD drawings may be complex, confusing, and fail to provide an end-user (e.g., a potential client) with a drawing or visualization of the "intent" of the architect or designer. Architectural renderings are designed to illustrate the "intent" of the designer or architect, as opposed to showing precise fidelity. In these renderings, the illustrator may want to highlight certain aspects of the layout, while de-emphasizing others. In the prior art, such highlighting was only possible with respect to an entire drawing or particular objects within a drawing. Further, there was no method for slowly transitioning from a highlighted area to a non-highlighted area. Such problems may be better understood with a description of prior art drawing software and methodologies.

CAD programs provide high fidelity drawings that fail to provide a visualization of the intent of the user. Architectural renderings may take a variety of forms or styles from hand-drawn renderings, to cartoon-like rendering, to ultra-realistic 3D rendering. In such renderings, designers may desire to illustrate certain regions differently than other regions/areas. For example, rendering effects may be different for different structures within a drawing, or with respect to building proximity. Further, lines that fade into the distance may appear to wiggle. However, to date, the different styles and techniques for a computer illustration have typically been applied to entire drawings, or selected objects within a drawing. In addition, when a style is applied, the new style becomes permanent for the entire drawing or selected object(s).

Theoretically, the prior art may indirectly provide different styles for object(s) or portions of a drawing. In this regard, multiple versions of each vector object in a drawing would be built and blended together. Such actions would require breaking each set of vector objects (that need to be styled a certain way) into separate vector drawing files, applying a style to the different vector drawings, converting the stylized different vector drawings into bitmaps, and blending the bitmap drawings together using pixel blending techniques. However, such prior art techniques require numerous steps including user interaction, are processor intensive, and inflexible.

In view of the above, what is needed is an efficient and easy to use system for designating multiple illustration styles in a computer illustration that includes a mechanism for applying the style.

SUMMARY OF THE INVENTION

The prior art fails to provide the ability to efficiently and easily apply an appearance style to vector geometry across multiple layers of an architectural rendering. The invention overcomes the problems and deficiencies of the prior art. The user is enabled to create a closed geometry that is used to define a domain having an active region. An appearance style is selected and applied to the active region of the domain. Further, the transition from the active to inactive region of the domain (and the appearance styles for each region) may be defined by a blending region that can be controlled and modified by the user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The invention allows a designer or other user to create regions or "domains" in which different rendering effects are applied. These domains may be very precise, so that the transition between styles is abrupt, or they can be "soft"

regions in which the transitions are gradual, and the styles are algorithmically combined together.

The style effects are designed to be applied to vector illustrations—so, domain boundaries are described by vector geometry, and can include a blending region. The rendering styles are "non-destructive" in the sense that they can be applied to the artwork/geometry without affecting its fidelity. Thus, many different combinations of styles and domains can be developed and tested, without incurring permanent changes.

Hardware and Software Environment

Figure 1:
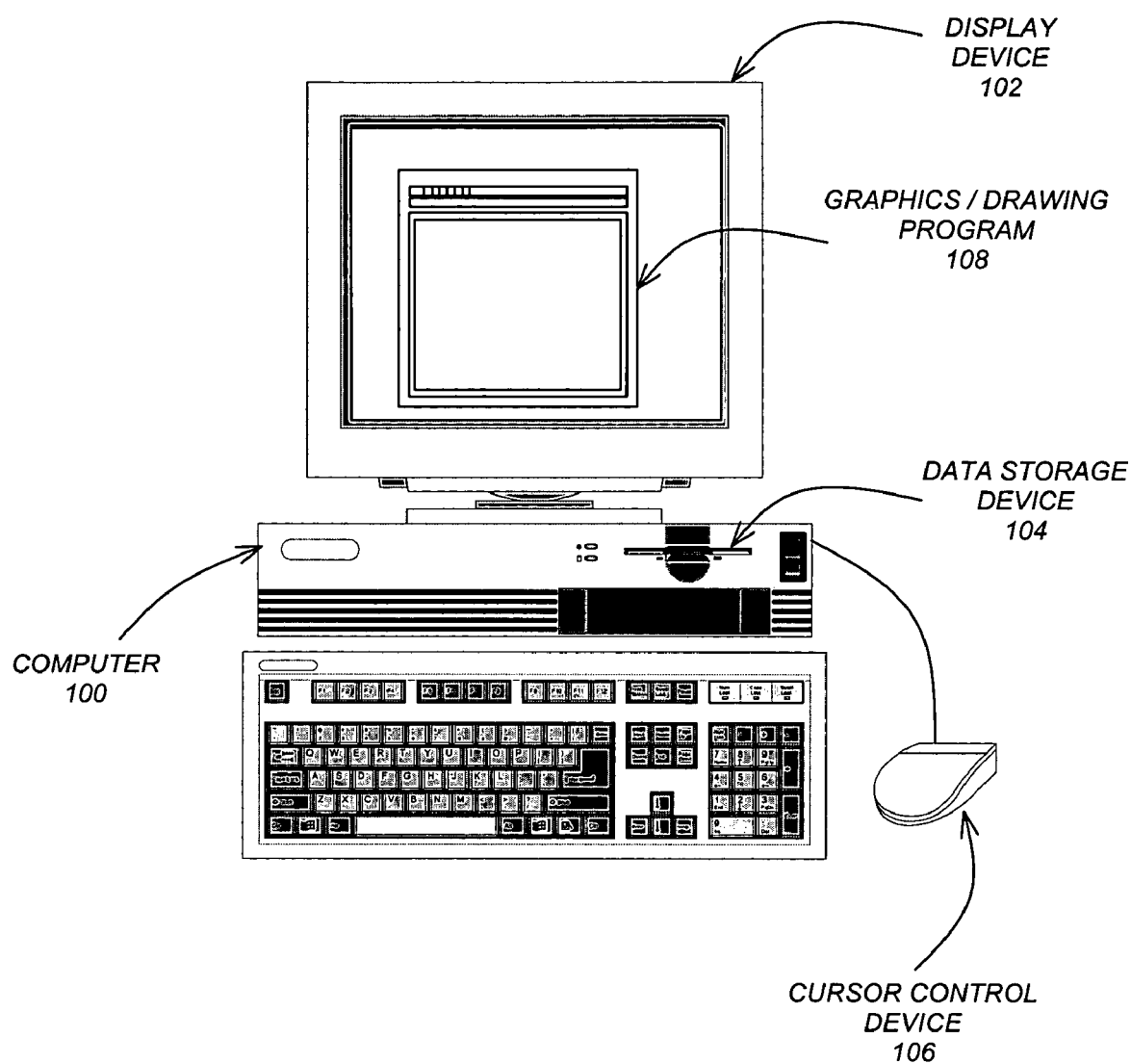
FIG. 1 is an exemplary hardware and software environment used to implement one or more embodiments of the invention

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device or media, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Rendering Software

In one or more embodiments of the invention, graphics program 108 is an architectural rendering application that provides a rendering (e.g., hand-drawn, cartoon-like, ultra-realistic 3D content) of a drawing. Another graphics program 108 may consist of a more precise fidelity application such as a CAD application. When using an architectural rendering application 108, a drawing (and its content) may be imported from the precise fidelity application. The architectural rendering application 108 may be enabled to preserve information from the precise fidelity application such as layer information, geometry, objects, views, etc.

As used herein, a drawing may have multiple layers wherein each layer refers to a collection of geometry. In addition, layers can be arranged into (nested) groups for organizational/selection purposes. Sub-layers allow a user to apply different appearance styles to elements on a common layer. If a user selects objects from more than one layer, sub-layers may be automatically created in each of the layers without moving selected objects into a new layer. However, to utilize or apply a style to a layer and/or sub-layer requires a permanent modification on a layer basis and/or to individual objects. Further, there is no transition area to provide for a transition from one sub-layer to another without significant user manipulation and processing.

As described above, the invention provides for the use of a domain in which different rendering effects or styles are applied. Domains can be very precise, so that the transition between styles is abrupt, or they can be "soft" regions in which the transitions are gradual, and the styles are algorithmically combined together. The effects or styles are designed to be applied to vector illustrations. Accordingly, domain boundaries are described by vector geometry, and can include a blending region. The rendering styles are "non-destructive" in the sense that they can be applied to the artwork/geometry without affecting its fidelity. Thus, many different combinations of styles and domains can be developed and tried, without making permanent changes.

A variety of rendering effects can be used within a domain. Such effects may include, but are not limited to:

Opacity: When on, all affected layers fade to a specified opacity value.

Desaturate: when on, all affected layers' colors are desaturated

Blur: When on, a blur is applied to all affected layers in the active domain region.

Jitter: Lines wiggle

Figure 2:
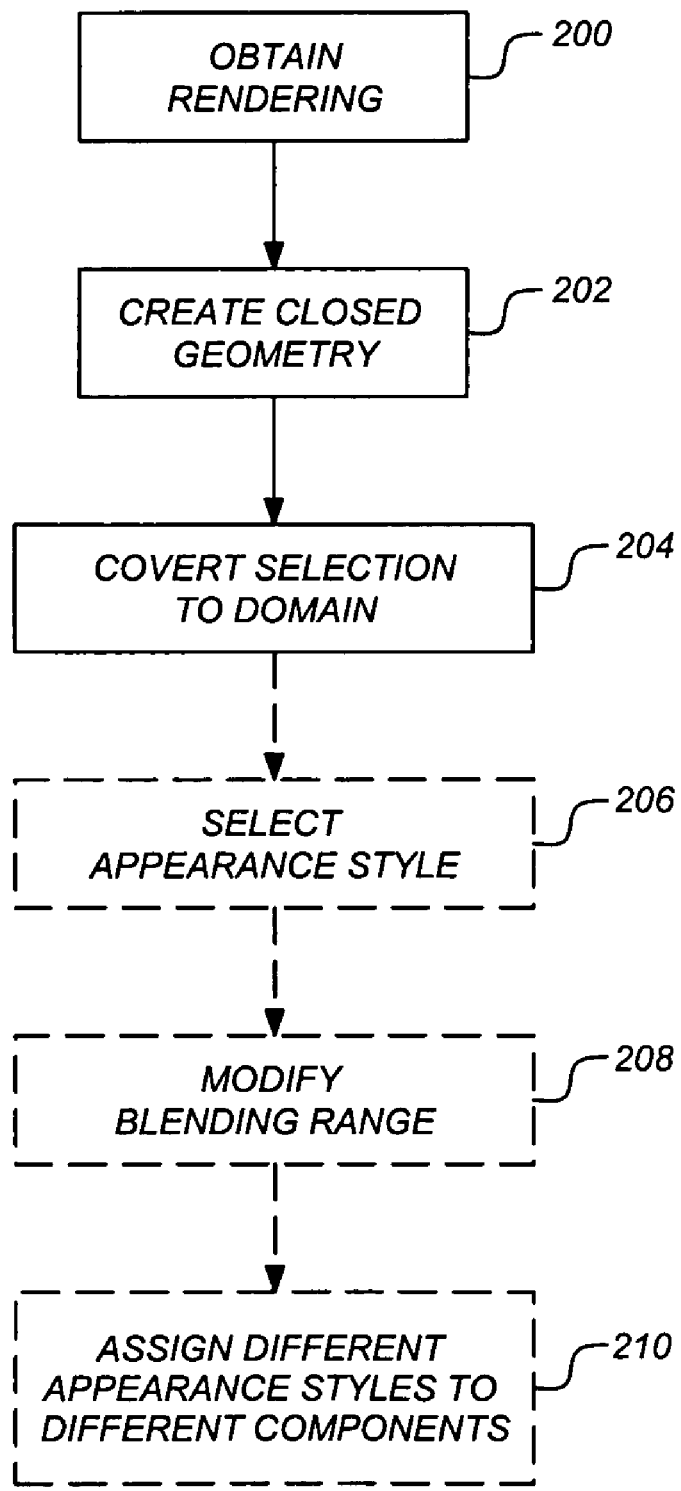
FIG. 2 illustrates the process for creating a domain in accordance with one or more embodiments of the invention.

As used herein, a domain is a geographical boundary that defines a series of one or more appearance style overrides. FIG. 2 illustrates the process for creating a domain in accordance with one or more embodiments of the invention. At step 200, a computer generated rendering consisting/comprising vector geometry is obtained. At step 202, a user creates and/or selects one or more pieces of non-overlapping, closed geometry in the rendering. The closed geometry may be required based on the definition of the domain. In this regard, domains may be required to be defined by closed regions. Further, a domain may include more than one closed region. However, such regions may not be permitted to overlap or be located inside one another. To create a new domain, a tool for a particular shape may be utilized. For example, a circle tool, rectangle tool, polygon tool, cloud tool, etc. may be used to create a new shape for a domain. The invention is not intended to limit the type or size of shape that may be selected or created. In this regard, any type and size of closed shape may be utilized in accordance with the invention.

At step 204, the objects/data within the selected/created closed geometry is converted to a domain. For example, a right-click menu, drop-down menu, or keystroke may be used to convert a selection to a domain. As part of this step, the invention may provide for error reporting if the user attempt to convert multiple or non-eligible geometry to a domain. In addition, if multiple shapes are created, each shape may be converted into a separate domain.

By default, when a domain is created, the domain may start as an outside domain (all vector geometry outside the closed geometry shape is defined as the active region and receives the new appearance style), with an outside appearance style that is blank (e.g., transparent). Accordingly, by default, objects outside of the domain may fade to nothingness. Alternatively, the domain may be an inside domain wherein the active region of the domain consists of all vector geometry inside of the domain. Whether the domain is an inside or outside domain may be determined by the user through the use of a toggling operation.

Steps 206-210 are optional steps that may be selected or performed by the user. At step 206, with the domain boundary selected, the user may choose/identify an appearance style and applies the appearance style to all components in the affected/active domain region. At step 208, with the domain boundary selected, the user may drag a tool that allows the user to change the blending range of the appearance style override. For example, the domain boundary may be dragged to a new location. Alternatively, a slider with percentages may be displayed that allows an alteration of the blending range. Any type of tool or widget may be used to change the blending range of the domain effect. Thus, the user may identify a blending region where the blending region transitions a default appearance style into the appearance style in the blending region. Such a blending region may be identified by a domain boundary (consisting of an outline of the closed geometry) and a blend line (consisting of a scaled copy of the domain boundary).

At step 210, the user may assign different appearance styles to different components within a single domain (e.g., in a document map interface/properties dialog) (see description below).

Appearance Style Overrides/Domain Effects

As described above, once a closed geometrical shape is created at step 202 and converted to a domain at step 204, any style specified for the domain overrides the style for the objects/geometry within (or outside of) the shape. Accordingly, all geometry in the active domain region (either inside or outside of the shape depending on what the user has specified), receives an appearance style override. If the user elects an appearance style with the domain boundary selected, all components receive the selected style. Alternatively, the user can use the default style of specific components within the domain (i.e., in effect, ignoring the specified domain), or create copies of styles to apply specific settings to a single component.

Appearance style overrides can either replace the default appearance style or they can be overlaid on top of the default style. For example, if the style override is a single red stroke with no fill, and it is applied as an overlay style, all applicable geometry in the active domain region receives an additional red stroke "on top" of its regular appearance style. In addition, subtractive appearance styles may be available that would require unique domain styles. With a subtractive appearance style, the selected style or geometry would be subtracted from the existing style of the active region.

Inside/Outside Domains

Figure 3:
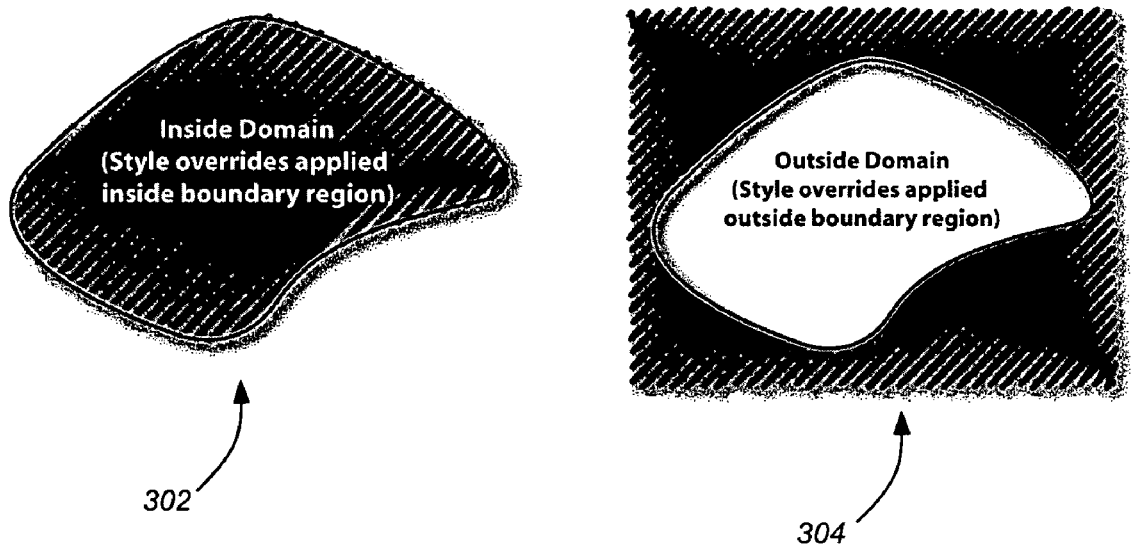
FIG. 3 illustrates the effect of an inside or outside domain selection in accordance with one or more embodiments of the invention.

Domains can apply effects inside or outside of a geographic boundary. FIG. 3 illustrates the effect of an inside or outside domain selection. When domain effects are applied inside of a domain, the style overrides apply inside the boundary region as indicated at 302. Alternatively, if domain effects are applied outside of a domain, the style overrides apply outside of the boundary region as indicated at 304. The black lines in 302 and 304 indicate the domain boundary and the shaded area indicates where the effects are applied.

Figure 4:
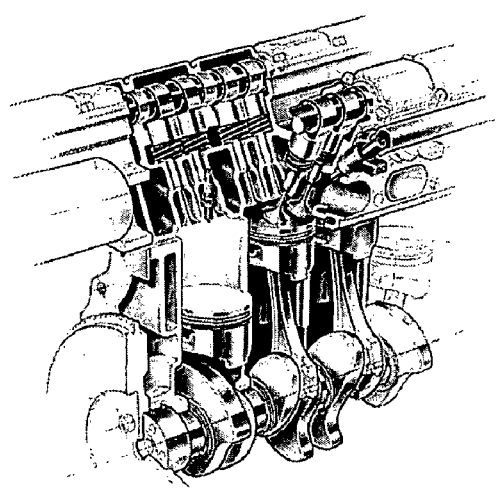
FIG. 4 illustrates a conceptual example of how an outside domain can be used to fade appearance styles to transparency in accordance with one or more embodiments of the invention.

By default, domains may be outside domains 304 with an empty (no stroke, no fill) (i.e., an opacity effect going decreasing to 0%) appearance style override applied to all objects outside of the domain. In this regard, the appearance style override applies to all layers in the file. FIG. 4 illustrates a conceptual example of how an outside domain 304 can be used to fade appearance styles to transparency. As illustrated in FIG. 4, the diagram is darker in the middle portion and fades out transparently. Further, it should be noted that domains do not apply appearance style overrides per-object but are actually applied per-pixel along any portion of geometry that exists in a domain region (e.g., independent from objects or layers). Thus, as described above, the appearance applies across all layers (unless specified otherwise).

Blending

Figure 5:
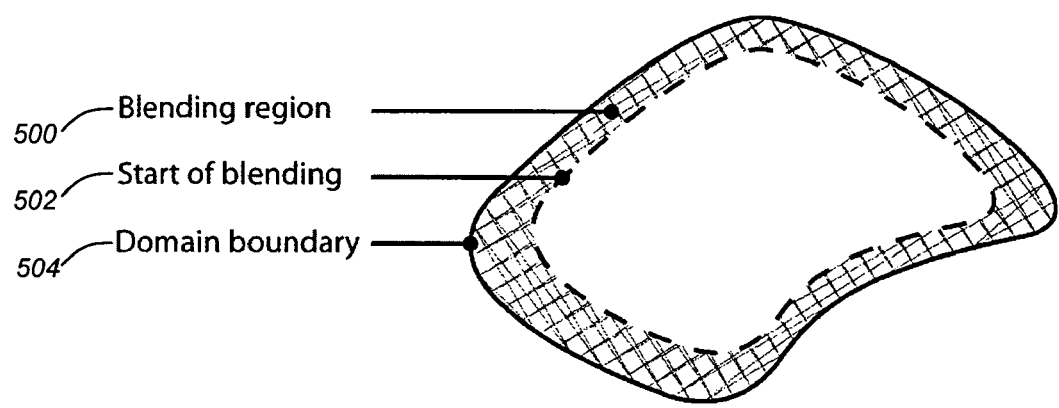
FIG. 5 illustrates a blending region in accordance with one or more embodiments of the invention.

All domains have a blending region where their default appearance style transitions into the modified appearance style. FIG. 5 illustrates the blending region 500 in accordance with one or more embodiments of the invention. The size of the blending region 500 is determined by the space between the domain boundary 504 and a blend line 502.

The blend line 502 is a copy (that is offset) of the domain boundary 504, that appears when the domain boundary 504 is selected. The user can drag on the blend line 502 to scale the blend line 502 (that shares a common center point with the domain boundary 504). As illustrated, the blend line 502 is inside of the domain boundary 504. Accordingly, the domain effect will begin inside of the domain boundary 504 (i.e., at the blend line 502) and will be complete by the domain boundary 504). The blend line 502 can be scaled outside of the domain boundary 504, in which case the start and endpoints of the blend swap. Alternatively, the user may also place the blend line 504 inside the domain boundary 504 with the blend region extending beyond the domain boundary 504 (e.g., by utilizing an additional end blend line [not shown]).

The user may also enter a "blend" value (e.g., in a properties palette after selecting the domain boundary 504). The blend value is entered as a percentage that represents the scale of the blend line 502 compared to the domain boundary 504.

Although a single domain may be restricted to non-overlapping regions, the user may be able to create multiple domains that overlap one another. When domains overlap, their precedence is determined by the horizontal position of each domain in a domain drawer of a document map interface (see detailed description below). Domains on the right "trump" domains to their left. If the style overrides for overlapping domains are additive (the rightmost domain doesn't overwrite the other's style, but adds to it), the rightmost domain's style is at the top of their relative draw order stack. Further, the user may be provided with the ability to re-arrange the domain draw order.

Thus, as described above, the blending region 500 provides an area where various parameters are blended together. For example, the color, thickness, medium used to draw a line, effects, roughness, etc. may be blended smoothly within the transition/blending region 500. In this regard, the blending region 500 may be used to determine the type of blend and the speed of the transition. In one or more embodiments, the blending region 500 is purely spatially based and the transition rate does not change across the region. Alternatively, the user may have the ability to adjust the transition/blend rate. The user can adjust a spline or use an algorithm that determines the transition speed across the blending region 500. For example, the user can adjust a spline such that the transition rate is slow for the first half of the transition but increases exponentially thereafter. Alternatively, a constant rate of transition may be specified.

It may also be noted that to perform the blending operation, the invention may perform a variety of steps. First, the original image with the original appearance style may be converted into a bitmap representation (i.e., it is rendered). Thereafter, the various parameters and style attributes may be changed. A new bitmap/rendered version of the drawing with the new parameters may then be generated. The two bitmaps/renderings may then be combined using an alpha blending over the transition/blending region 500 that transitions from the original appearance style to the new/modified appearance style. To expedite processing, only a portion of the images within the blending region 500 may be generated into a bitmap in both the original appearance style and the new appearance style. Further, the alpha blending operation may utilize the spline or other operation to control the rate/speed of blending as described above.

User Interface

Figure 6:
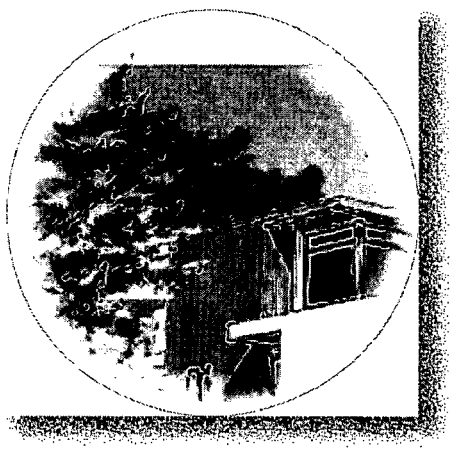
FIG. 6 illustrates the display of a domain using a roll-over operation in accordance with one or more embodiments of the invention.

Domain boundary lines 504 are not always displayed in a viewport, except when the mouse rolls over them. When rolled over, the domain may display as a 1 pixel thick (zoom independent) cyan [RGB=74, 255, 255] line as illustrated in FIG. 6.

Figure 7:
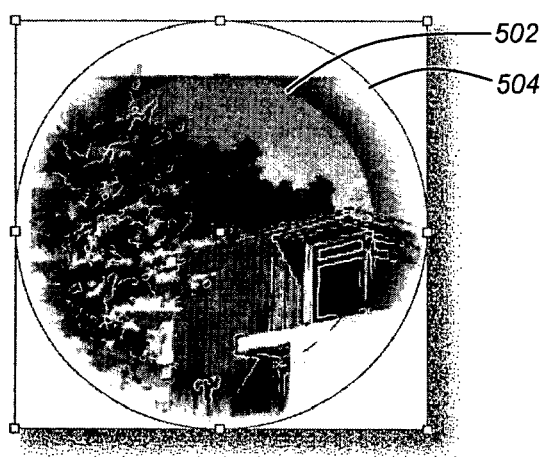
FIG. 7 illustrates the selection of a domain with a domain boundary line and blend line in accordance with one or more embodiments of the invention.

Domain boundary lines 504 may be directly selected in a viewport. The domain blend line 502 is a dashed 1 pixel thick cyan line; with the region between the blend line 502 and the domain boundary line 504 filled blue [RGB=10, 80, 161], with 10% opacity. The domain blend line 502 (and region) may only display when the domain boundary 504 is selected. FIG. 7 illustrates the selection of a domain with a domain boundary line 504 and blend line 502. Domain boundaries 504 are analogous to guides and may not belong to the figures.

Figure 8:
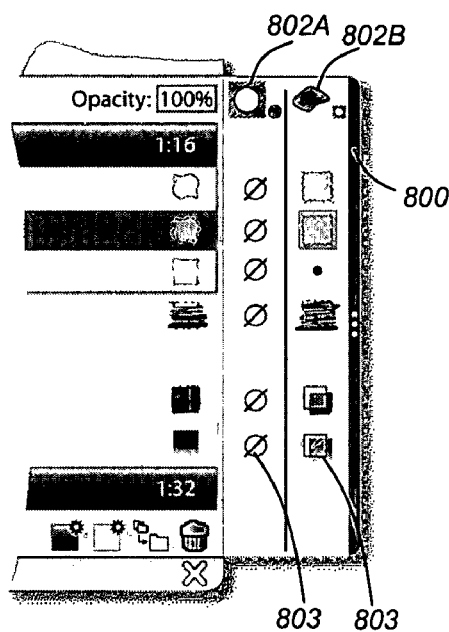
FIG. 8 illustrates a domain interface that is attached as a drawer on a window in accordance with one or more embodiments of the invention.

A domain interface 800 as illustrated in FIG. 8 is attached as a drawer on a window (e.g., that consists of a document map) in accordance with one or more embodiments of the invention. The top of the drawer 800 displays a boundary swatch 802A-802B indicating the domain's shape, as well as whether the domain is an inside/outside domain. Further, additional swatches 803 may be displayed next to each component to indicate the effect of the domain on that component.

When no domains exist in a drawing, the domain drawer 800 may provide the user with a button to create a new domain, as well as a link to the help system. When the user elects to create a new domain (e.g., in accordance with step 202), a closed drawing tool (e.g., an ellipse tool) may be activated or selected by the user to create the closed shape that will be converted into a domain in accordance with step 204. In this regard, a default closed shape tool may be used to create an outside domain with all components set to empty by default.

Figure 9:
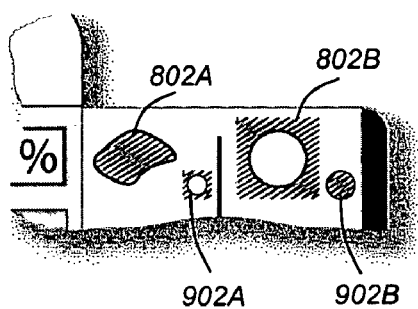
FIG. 9 illustrates an enhanced view of the boundary swatches illustrated in FIG. 8 in accordance with one or more embodiments of the invention.
Figure 10:
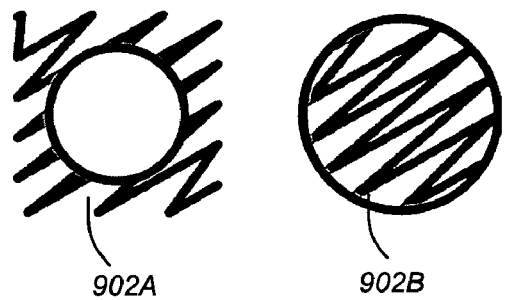
FIG. 10 illustrates an enhanced view of the toggles of FIG. 8 and FIG. 9 in accordance with one or more embodiments of the invention.

FIG. 9 illustrates an enhanced view of the boundary swatches 802A and 802B. The swatches 802A and 802B display a preview of the actual shape of the domain with the shading indicating whether the domain is an inside 802A or outside 802B domain. The user may also manually select a swatch 802 that would select the corresponding domain boundary 504 in the drawing (which can also be selected directly in the viewport). The buttons to the right of each swatch 802 are toggles 902A and 902B that toggle whether the domain is inside/outside. An enhanced view of the toggles 902 is illustrated in FIG. 10.

When the boundary swatch 802 is selected, various options may be available (e.g., via right click action with a cursor control device). For example, the user may have the option to toggle the type of domain via a "Make Inside/Outside" option. The label for this option depends on the current type of domain (e.g., when right-clicking an inside domain, the label may read "Make Outside"). Other options may allow the selection of a domain boundary object in the viewport, the selection of all of the swatches for a specific domain or the ability to delete a domain.

Additional options may include the ability to set on/off toggles for all layers that fall within the active domain region, the ability redraw the domain (e.g., makes the ellipse tool active letting the user draw a new shape to define the domain's boundary) (the user may switch drawing tools when drawing the domain boundary 504, however, an error message may appear if the user does not draw a closed region), the ability to select a new shape (makes a direct selection tool active, letting the user choose a shape in the viewport to define the domain's boundary), and the ability to move a domain forward/back/left/right (which moves the domain forward/back/left/right in the domain drawer 800 that either lowers or raises the particular domain in the draw order stack).

Figure 11:
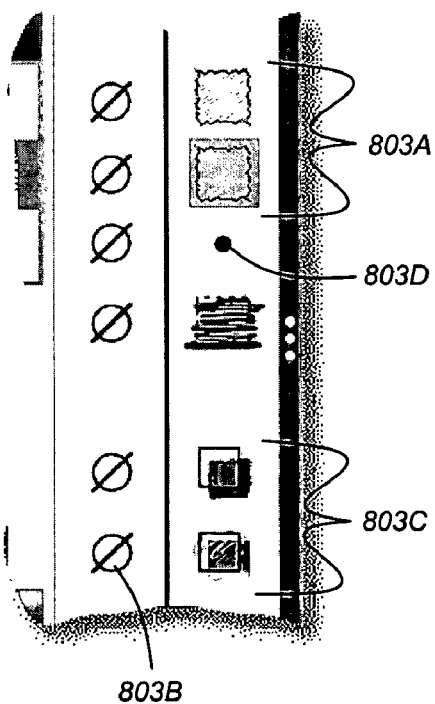
FIG. 11 is an enhanced view of the various style swatches of FIG. 8 in accordance with one or more embodiments of the invention.

FIG. 11 is an enhanced view of the various style swatches 803 in accordance with one or more embodiments of the invention. Each component (one component or layer is displayed in each row) receives its own appearance style override in a domain. These styles appear as swatches 803 in the domain column adjacent to each component/layer. The user can select each swatch 803 and edit its properties (e.g., using another properties window referred to as a style builder palette). The user can also select multiple swatches 803 within the same domain to perform a mass style replacement or to apply common functionality (e.g., via a right click menu). FIG. 11 illustrates examples of four different types of swatches 803. When a single swatch 803A appears, it replaces the default style for that component in the active domain region. Replace swatches 803A appear as normal style swatches. In FIG. 11, the bottom replacement swatch 803 is currently selected.

The empty style swatch 803B is a special type of replacement style. The empty style 803B is actually a style with no stroke or fill. A special icon 803B indicates that the component is not displayed in the active domain region. Thus, the empty style 803B is used to fade styles out to nothingness, and may be applied to all components when the user first creates a domain. Thus, as illustrated, each component in the active domain region of domain 802A will not be displayed in the active domain region (because they all have empty domain swatches 803B displayed).

The overlay swatch 803C is added to the default style in the active domain region. Overlay swatches 803C appear with the overlaid style on top of the default style.

If the component is set to ignore the domain, a black dot 803D appears in the domain column.

By default, all components may receive instances of the same style. The user can also drag swatches 803 to replace any other style in the document map, to or from domains, as well as from a main component list. When a swatch 803 is selected, various options may be available to the user (e.g., via a right-click menu). Options may allow the user to set the type of style (e.g., replace, empty, overlay/additive), ignore the domain for a specific component, apply a style to all components, use a copy of a current style (a copy of a highlighted component's style is created to allow the customization of the properties of a style for a specific component without updating all other instances of the assigned style), use a copy of a default style (a highlighted component's style is replaced with a copy of the components default style to allow users to make changes to the default style without affecting objects outside of the active domain region), or apply a style across a domain (copies the highlighted override style, including type, to all components for the selected domain).

Figure 12:
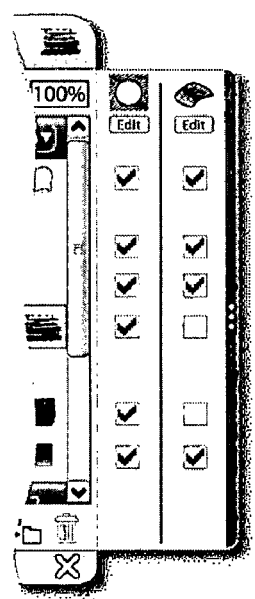
FIG. 12 illustrates layer toggles for a domain in accordance with one or more embodiments of the invention.

As an alternative to illustrating the swatches 803 below each domain for each layer, on/off toggles may appear below the domain as illustrated in FIG. 12. The user can click each checkbox to toggle the setting. When a domain is toggled off for a layer (i.e., a checkmark does not appear), that layer ignores all domain effects. Thus, each layer and sub-layer is either on (checked) or off (unchecked) for a domain. If it is "on", it is affected by the domain; if "off", then the layer/sub-layer ignores the domain effects. The user may have the option of turning on all domain effects for all layers or turning off all domain effects for all layers (e.g., using a check all or uncheck all option).

All of the domains may have various properties that can be adjusted through a properties palette window. A general group of properties may include the width of the domain shape, the height of the domain shape, the x-coordinate of the domain's center and the y-position of the domain's center. The user may also have the option of locking/fixing the width/height ratio.

A domain group of properties allows the affected/blending region 502 as the inside or outside, a blend option for scaling the size of the blending region (e.g., a slider may be used from no blending [i.e., the blend line 502 is the same as the domain line 405] to infinity where blending occurs across the entire active domain region).

An effects group of properties may include an opacity toggle (that determines whether or not all affected layers fade to a specified opacity value), an opacity value/amount (a final opacity value for a domain [e.g., a slider with 0 for fully transparent to 100% for no transparency], a desaturate toggle (when active, all affected layer's colors are desaturated [converted to grayscale]), a desaturation value/amount (e.g., a percentage range where 0% removes all color and 100% retains all color), a blur toggle (that determines whether or not a blur is applied to all affected layers in the active domain region), a blur type (that sets the type of blur) (e.g., Gaussian, radial, default, etc.), a Gaussian blur radius (that establishes the size of a Gaussian blur [e.g., from 0.1-2.50 px]), a radial blur amount (that determines the amount of rotation blur from 1-100), and a radial blur method (that determines the type of radial blur [e.g., spin or zoom]).

Style Map

As described above, various styles may be applied to one or more domains. To provide additional flexibility, the invention also enables the user to import or export a style in the form of a style map. A style map is essentially a file that contains the layer/style assignments and all of the relevant style definitions. When a user imports a style map, any layers matching the name of the layers in the imported file receive the corresponding appearance style (e.g., the style override would apply). Further, all of the styles defined in the imported file may be added to a palette of the styles available to the user (e.g., for subsequent style selection).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for modifying an appearance style of a computer generated rendering, comprising:
    (a) obtaining a computer generated rendering comprised of first vector geometry that constitutes one or more geometric objects;
    (b) receiving input from a user graphically creating a closed second geometry in the computer generated rendering, wherein the closed second geometry is graphically created by the user graphically drawing one or more pieces of non-overlapping closed geometric shapes;
    (c) converting the closed second geometry to a domain;
    (d) identifying a appearance style for an active region of the domain, wherein the second appearance style comprises a rendering effect; and
    (e) applying the second appearance style for the domain to all first vector geometry in the active region on a per-pixel basis, wherein the active-region of the domain comprises a portion of the first vector geometry independent from the one or more geometric objects.

2. The method of claim 1, wherein the active region of the domain comprises all first vector geometry outside of the domain.

3. The method of claim 1, wherein the active region of the domain comprises all first vector geometry inside of the domain.

4. The method of claim 1, further comprising toggling the active region of the domain between all first vector geometry inside of the domain and all first vector geometry outside of the domain.

5. The method of claim 1, wherein the applying of the second appearance further comprises:
    identifying a blending region of the domain; and
    transitioning a default appearance style into the appearance style in the blending region.

6. The method of claim 5, wherein the blending region is identified by a region in between:
    a domain boundary comprised of an outline of the closed second geometry; and
    a blend line comprised of a scaled copy of the domain boundary.

7. The method of claim 1, wherein the second appearance style comprises an opacity effect when all first vector geometry in all affected layers in the active region fade to a specified opacity value.

8. The method of claim 1, wherein the second appearance style comprises a desaturate effect wherein all first vector geometry in all affected layers in the active region are desaturated.

9. The method of claim 1, wherein the second appearance style comprises a blur effect wherein a blur is applied to all first vector geometry in all affected layers in the active region.

10. The method of claim 1, wherein the second appearance style comprises a jitter effect wherein lines in the active region wiggle.

11. The method of claim 1, wherein:
    all of the first vector geometry in the computer generated rendering has a first appearance style; and
    the second appearance style overrides the first appearance style for the first vector geometry in the active region of the domain.

12. The method of claim 1, wherein the graphically drawing comprises graphically drawing by using a tool to select and create the one or more geometric shapes from a list of predefined geometric shapes.

13. An apparatus for modifying an appearance style of a computer generated rendering in a computer system comprising:
    (a) a computer having a memory;
    (b) an application executing on the computer, wherein the application is configured to
        (i) obtain a computer generated rendering comprised of first vector geometry that constitutes one or more geometric objects;
        (ii) receive input from a user that graphically creates a closed second geometry in the computer generated rendering, wherein the closed second geometry is graphically created by the user graphically drawing one or more pieces of non-overlapping closed geometric shapes;
(iii) convert the closed second geometry to a domain;
(iv) identify a appearance style for an active region of the domain, wherein the appearance style comprises a rendering effect; and
(v) apply the appearance style for the domain to all first vector geometry in the active region on a per-pixel basis, wherein the active-region of the domain comprises a portion of the first vector geometry independent from the one or more geometric objects.

14. The apparatus of claim 13, wherein the active region of the domain comprises all first vector geometry outside of the domain.

15. The apparatus of claim 13, wherein the active region of the domain comprises all first vector geometry inside of the domain.

16. The apparatus of claim 13, wherein the application is further configured to toggle the active region of the domain between all vector first geometry inside of the domain and all first vector geometry outside of the domain.

17. The apparatus of claim 13, wherein the application is configured to apply the appearance by:
identifying a blending region of the domain; and
transitioning a default appearance style into the appearance style in the blending region.

18. The apparatus of claim 17, wherein the blending region is identified by a region in between:
a domain boundary comprised of an outline of the closed second geometry; and
a blend line comprised of a scaled copy of the domain boundary.

19. The apparatus of claim 13, wherein the appearance style comprises an opacity effect when all first vector geometry in all affected layers in the active region fade to a specified opacity value.

20. The apparatus of claim 13, wherein the appearance style comprises a desaturate effect wherein all first vector geometry in all affected layers in the active region are desaturated.

21. The apparatus of claim 13, wherein the appearance style comprises a blur effect wherein a blur is applied to all first vector geometry in all affected layers in the active region.

22. The apparatus of claim 13, wherein the appearance style comprises a jitter effect wherein lines in the active region wiggle.

23. The apparatus of claim 13, wherein the graphically drawing comprises graphically drawing by using a tool to select and create the one or more geometric shapes from a list of predefined geometric shapes.

24. An article of manufacture comprising a program storage device, readable by a computer, tangibly embodying at least one program of instructions executable by the computer to perform a method that causes a computer- implemented system to modify an appearance style of a computer generated rendering, the method steps comprising the steps of:

obtaining a computer generated rendering comprised of first vector geometry that constitutes one or more geometric objects;
receiving user input graphically creating a closed second geometry in the computer generated rendering, wherein the closed geometry is graphically created by the user graphically drawing one or more pieces of non-overlapping closed geometric shapes;
converting the closed second geometry to a domain;
identifying a appearance style for an active region of the domain, wherein the appearance style comprises a rendering effect; and
applying the appearance style for the domain to all first vector geometry in the active region on a per-pixel basis, wherein the active-region of the domain comprises a portion of the first vector geometry independent from the one or more geometric objects.

25. The article of manufacture of claim 24, wherein the active region of the domain comprises all first vector geometry outside of the domain.

26. The article of manufacture of claim 24, wherein the active region of the domain comprises all first vector geometry inside of the domain.

27. The article of manufacture of claim 24, wherein the logic further comprises toggling the active region of the domain between all first vector geometry inside of the domain and all first vector geometry outside of the domain.

28. The article of manufacture of claim 24, wherein the logic for applying the appearance further comprises logic for:
identifying a blending region of the domain; and
transitioning a default appearance style into the appearance style in the blending region.

29. The article of manufacture of claim 28, wherein the blending region is identified by a region in between:
a domain boundary comprised of an outline of the closed second geometry; and
a blend line comprised of a scaled copy of the domain boundary.

30. The article of manufacture of claim 24, wherein the appearance style comprises an opacity effect when all first vector geometry in all affected layers in the active region fade to a specified opacity value.

31. The article of manufacture of claim 24, wherein the appearance style comprises a desaturate effect wherein all first vector geometry in all affected layers in the active region are desaturated.

32. The article of manufacture of claim 24, wherein the appearance style comprises a blur effect wherein a blur is applied to all first vector geometry in all affected layers in the active region.

33. The article of manufacture of claim 24, wherein the appearance style comprises a jitter effect wherein lines in the active region wiggle.

34. The article of manufacture of claim 24, wherein the graphically drawing comprises graphically drawing by using a tool to select and create the one or more geometric shapes from a list of predefined geometric shapes.

* * * * *